United States Patent
Sternig et al.

(10) Patent No.: US 11,361,447 B2
(45) Date of Patent: Jun. 14, 2022

(54) IMAGE CROPPING USING PRE-GENERATED METADATA

(71) Applicant: Amazon Technologies, Inc., Seattle, WA (US)

(72) Inventors: Sabine Sternig, Berlin (DE); Luitpold Staudigl, Bonn (DE); Pablo Barbachano, Berlin (DE); Thomas Sydney Austin Wallis, Tübingen (DE); Muhammad Bilal Javed, Berlin (DE); Michael Donoser, Gerlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/912,366

(22) Filed: Jun. 25, 2020

(65) Prior Publication Data

US 2021/0407100 A1   Dec. 30, 2021

(51) Int. Cl.
*G06F 16/583* (2019.01)
*G06T 7/168* (2017.01)
*G06V 10/46* (2022.01)
*G06V 40/16* (2022.01)

(52) U.S. Cl.
CPC .... *G06T 7/168* (2017.01); *G06T 2207/20132* (2013.01)

(58) Field of Classification Search
None
See application file for complete search history.

(56) References Cited

U.S. PATENT DOCUMENTS

| 7,734,058 | B1 | 6/2010 | Adams et al. | |
| 8,799,756 | B2 * | 8/2014 | Grosz | G06F 3/1205 715/202 |
| 10,685,057 | B1 * | 6/2020 | Chavez | G06N 3/08 |
| 2004/0212695 | A1 * | 10/2004 | Stavely | H04N 21/84 348/231.3 |

(Continued)

OTHER PUBLICATIONS

International Search Report and the Written Opinion for PCT/US2021/038949, dated Oct. 12, 2021, 14 pages.

(Continued)

*Primary Examiner* — Soo Shin
(74) *Attorney, Agent, or Firm* — Klarquist Sparkman, LLP

(57) ABSTRACT

In operating an ecommerce marketplace, pre-generated metadata is used to transform images after a request is received, in real-time, and with low latency. To accomplish the high-speed image transformation, an offline annotation of relevant image features is obtained using machine learning and metadata is stored based upon the results. The metadata is then used to perform the high-speed image transformation at request time. The transformations can include image cropping, adjustment in saturation, contrast, brightness, extracting portions of the image, etc. In one example, the metadata includes a bounding box giving coordinates of how to crop an image so that the image can be cropped without analyzing content or context of the image. Instead, to obtain the coordinates of the bounding box, content and context of the image are analyzed in pre-request processing. In this way, when the request is received, the more difficult and time-consuming processing is already completed.

17 Claims, 8 Drawing Sheets

(56) References Cited

U.S. PATENT DOCUMENTS

| | | | |
|---|---|---|---|
| 2010/0049707 A1* | 2/2010 | Faria | G06F 16/58 |
| | | | 707/749 |
| 2014/0096018 A1* | 4/2014 | Iannucci | G06F 3/1242 |
| | | | 715/738 |
| 2014/0195921 A1* | 7/2014 | Grosz | G06Q 30/0601 |
| | | | 715/738 |
| 2017/0249719 A1* | 8/2017 | Kansara | G06K 9/00228 |
| 2018/0174299 A1* | 6/2018 | Agrawal | G06T 7/90 |
| 2018/0181593 A1 | 6/2018 | Ranzinger et al. | |
| 2019/0294631 A1* | 9/2019 | Alcantara | G06N 3/084 |
| 2019/0304064 A1* | 10/2019 | Zhang | G06T 3/4046 |
| 2021/0279052 A1* | 9/2021 | Nabar | G06F 11/1469 |
| 2021/0280322 A1* | 9/2021 | Frank | G16H 50/20 |

OTHER PUBLICATIONS

Karmakar et al., "Face Recognition using Face-Autocropping and Facial feature Points Extraction," *Proceedings of the 2$^{nd}$ International Conference on Perception and Machine Intelligence*, Jan. 2015, pp. 116-122.

\* cited by examiner

IMAGE CROPPING USING PRE-GENERATED METADATA

BACKGROUND

In an ecommerce marketplace, customers view millions of images per day, such as images of fashion. Third-party vendors supply images of their products to the ecommerce marketplace. As customer preferences and trends vary over time, website developers want to quickly test new ideas on website retail pages. While it is usually straightforward to implement low-level image transformations, such as resizing or changing the image quality, content aware image processing creates novel challenges. Replacing images in an image catalogue typically involves coordination with a large number of the third-party vendors and significant quality assurance efforts. Fast iterations of image replacement are difficult to implement. Performing image alterations at request time allows more control over the process, but the latency concerns and the number of image alterations makes request-time alterations impractical.

DETAILED DESCRIPTION

Figure 1:
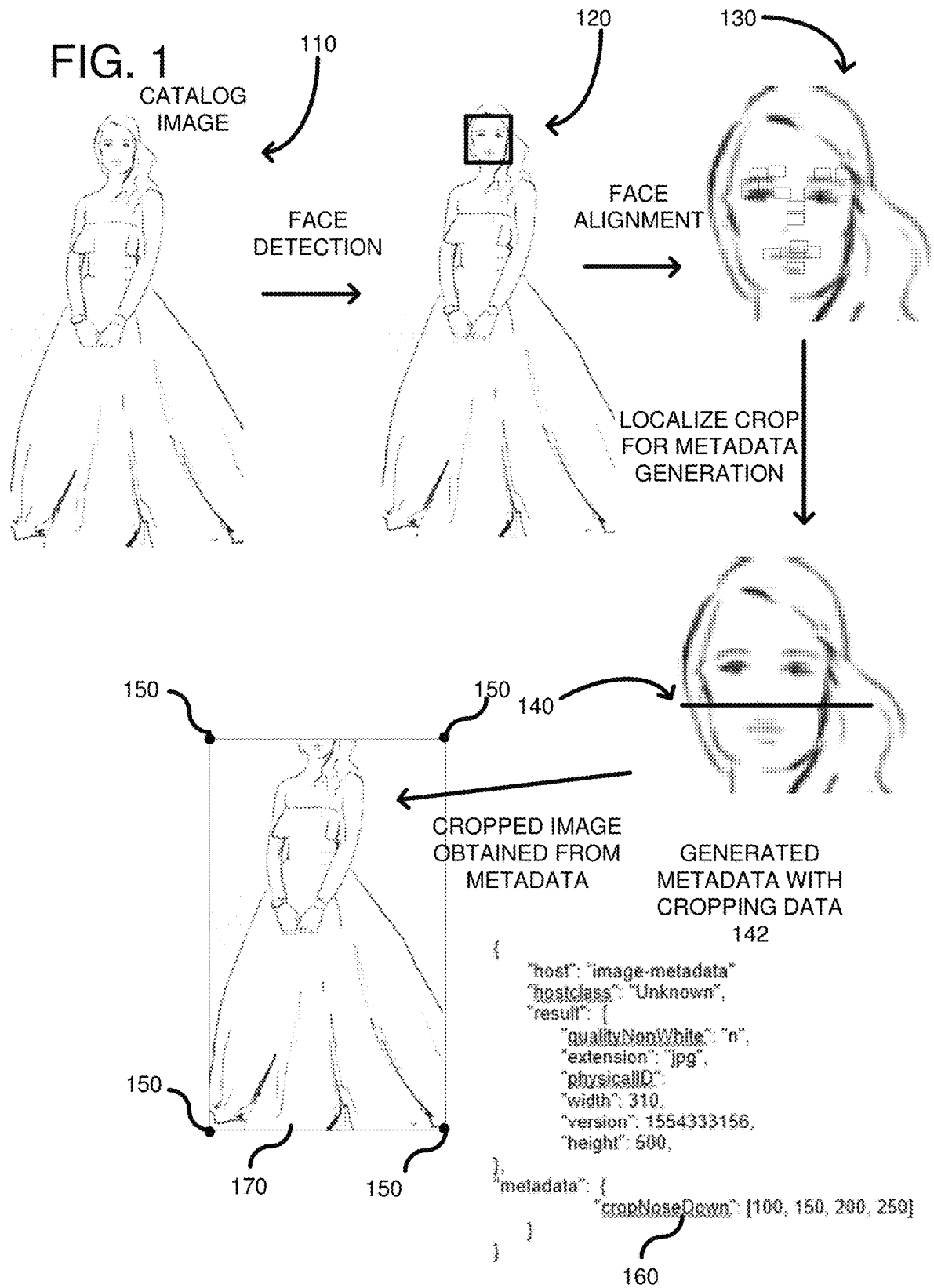
FIG. 1 shows an example of generation of metadata used for request-time image alterations.

In operating an ecommerce marketplace, pre-generated metadata is used to crop images after a request is received, in real-time, and with low latency. The meta data is generated through a Machine Learning model can be used for image transformations such as: adjustment of pixels based on image statistics (e.g., saturation, brightness, contrast) or applying kernel operations (e.g. sharpening) either for the image as a whole or for parts of the image. Accordingly, the image transformations happen much quicker than the generation of the required meta information that is used for the transformation. A specific example could be: whenever a women in a red dress is found in an image, the saturation of the image should be increased to increase the intensity of the red dress. If a women in a green dress is found, then the saturation of the image should be decreased and images should appear "flatter" than they were originally. Adjusting the saturation of the image is dependent on running a specific computer vision task that requires semantic understanding of the image. Thus, embodiments herein can perform low-level computer vision tasks not requiring any understanding of the image based on the extraction of a higher level semantic image understanding.

In one example, the metadata includes a bounding box giving coordinates of how to crop an image so that the image can be cropped without analyzing content or context of the image. Instead, to obtain the coordinates of the bounding box, content and context of the image are analyzed in pre-request processing. In this way, when the request is received, the more difficult and time-consuming processing is already completed. The system achieves the required accuracy through available face-detection models and heuristics. When a user requests a webpage, the original images (uncropped) can by dynamically cropped based upon the request and at high speed. To accomplish the high-speed cropping, an offline annotation of relevant image features is obtained using machine learning and metadata is stored based upon the results. The metadata is then used to perform the high-speed cropping at run time.

In one example, for cropping below the nose, machine learning is used to identify a consistent location. Generally, face detection is used to locate a face in an image and facial landmark detection is used to locate features of the located face. Face detection has been used in Human-Computer Interaction (HCI), video-surveillance, and security systems. Feature-based approaches have also been developed using boosted classifiers to identify features that describe faces. Two-stage methods, such as Faster R-CNN, and single-stage methods, such as RetinaNet, can be used. Facial landmark detection, which is also known as facial keypoint detection or face alignment, is the task of identifying predefined facial landmarks, such as the corners of eyes, eyebrows or the tip of the nose.

Facial detection for images used in a retail online marketplace are adapted to detect faces in catalog images. A Single-Shot Scale-Invariant Face Detector (S3FD) can be used that applies extra convolutional layers and detection layers, wherein each detection layer is associated with a specific scale anchor to detect corresponding scale faces. A stride size of anchor-associated layers ensures that different scales of faces have adequate features for detection at corresponding anchor-associated layers and that different scales of anchors have a same density on the image. Another facial detection algorithm is RetinaFace wherein additional segmentation information in a segmentation branch improves object detection results. RetinaFace employs supervised and self-supervised multi-task learning in parallel with the existing box classification and regression branches. Each positive anchor predicts a face score, a face box, five facial landmarks, and dense 3D position and correspondence of each facial pixel. A variety of facial landmark localization algorithms can be used. In one, the framework is based on gradient boosting for learning the ensemble of regression trees where a sparse subset of pixel intensities is used to regress the location of facial landmarks.

FIG. 1 is an example embodiment wherein metadata is generated using content and context analysis. As explained further below, the metadata is "pre-generated" relative to a request. Thus, the metadata is generated before a request and later used after a request is received to perform fast cropping of the image without the need of further content and context analysis. A catalog image 110 is supplied from a third-party seller for an e-commerce marketplace. The image 110 is of a person wearing clothing for sale. At 120, facial detection is performed using any of the available methods described above. Likewise, at 130, facial landmark localization algorithms can be used to find facial alignment and facial features, such as corners of the eyes, the nose, and the mouth. At 140, a below-the-nose line is generated at the base of the person's nose. The below-the-nose line 140 is then used to generate metadata 142 including a bounding box defined by points 150. The metadata 142 includes the bounding box coordinates at 160, which are 4 pixel coordinates associated with the image. As described further below, future requests that ask for the image 110 and with below-the-nose cropping, can skip the face detection 120, face alignment 130, and the below-the-nose line 140, and merely use the pre-generated metadata 160 to quickly generate the cropped image 170. In any of the above processes, machine learning can be used to facilitate identification of facial features and to generate the metadata.

Figure 2:
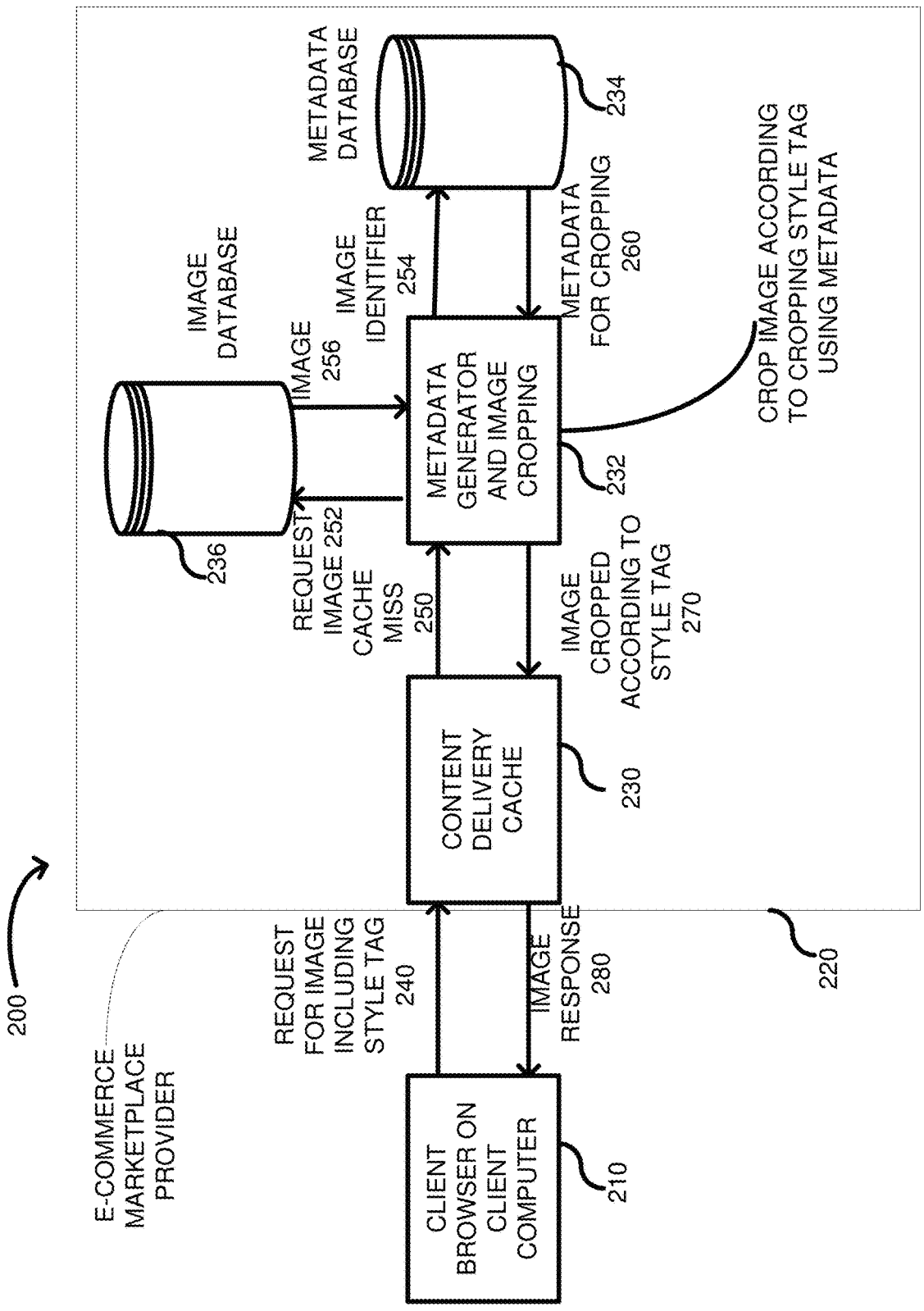
FIG. 2 is a system according to one embodiment for generating metadata used for request-time image alterations, wherein a request is shown having a cropping style tag.

FIG. 2 is an example system 200 for providing cropped images with low latency. A client browser 210 executing on a client computer accesses an ecommerce marketplace backend 220 to obtain images to display to a user. The images can include multiple images a person, such as was shown in FIG. 1, wherein the person is modeling clothing, shoes, etc. The ecommerce marketplace backend 220 includes a content delivery cache 230, a metadata generator and image cropper 232, a metadata database 234, and an image database 236. The ecommerce marketplace backend 220 can be modified in multiple ways, such as by combining databases 234, 236, eliminating cache 230, splitting the metadata generator from the image cropping 232, etc. Any of the described blocks includes software executing on one or more server computers, such as a computer of FIG. 8 described below. The client browser 210 transmits a request 240 that is received by the content delivery cache 230 (after passing through an endpoint, authentication, etc. (not shown)). The request 240 is, for example, an HTML request for an image and includes an image identifier and a cropping style tag. The cropping style tag requests that the image be modified by cropping the image using a variety of cropping techniques, such as cropping from the nose down. Cropping an image, in this context, refers to removal of a section (e.g., entire sequential rows) of an image to modify the image appearance, as opposed to merely removing selected pixels, which merely sharpens the image appearance. The content delivery cache 230 performs a lookup on the image identifier to determine if the image is available in the cache 230. If not, a cache miss notification 250 is transmitted to the metadata generator and image cropping 232. The metadata generator and image cropping 232 requests the image at 252 from the image database 236 using the image identifier and requests metadata from the database 234 using the image identifier 254. These requests 252, 254 can occur in parallel when there are separate databases 234, 236, as shown. The image is returned 256 in response to the request 252 and the metadata 260 is returned that includes the results of predetermined cropping analysis. For example, the metadata can be bounding box coordinates obtained from previous analysis performed on the image including face detection, face alignment, nose identification, etc. Using the metadata 260, the metadata generator and image cropping 232 quickly crops the image with low latency and in accordance with the style tag of the request 240. The cropped image is returned at 270 to the content delivery cache 230, which caches the cropped image for future requests. The cropped image is then returned at 280 to the client browser 210 for display to the user.

Although FIG. 2 is described in relation to cropping, a variety of image transformations can be performed in addition to or alternatively to cropping. For example, the image transformations can include changes to brightness, saturation, color space, resizing, segmenting, extracting portions of image content, etc. Additionally, transformation rules can be derived from the metadata and the rules used in the image transformation. The metadata generator and image cropping 232 can include logic following a set of rules or policies on whether to use the metadata. In one example, the logic decides whether the image transformation takes longer than a predetermined period of time, and, if so, then the metadata is used. Otherwise, the transformation occurs without retrieving the metadata. The metadata can further be used for decisions whether to delete the image, flag the image (e.g., as inappropriate) or use the meta data in processing steps that are not directly linked to image transformations, but could also be "non-image transformation-related computer processing" (e.g., enrich the search catalog).

As the generation of the meta data based on semantic image understanding is computationally complex and expensive, heuristics or rule-based mechanisms can be put in place to ensure that these operations are only performed when necessary. To this end, information that is available for the image set (e.g. a product category, a human classification or the like) is considered and pre-processed before the computer vision models are applied. For example, to increase the saturation of red dresses whenever they are worn by a woman, a classifier/model need not be run on all image material, but only on the category "dresses" as only this category is relevant for the task. Extraction of features can be performed through computer vision for images that, based on additional classification and data that is available, update a list as images are added or removed, which reduces the computational complexity of processing the images.

Any of the described requests, such as requests 240, 252, 254, etc., can be implemented using an API. The described blocks, such as the metadata generator 232, can be a service in a cloud computing environment. A service is a software function provided at a network address over the web or the cloud. Clients initiate service requests to servers and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

Figure 3:
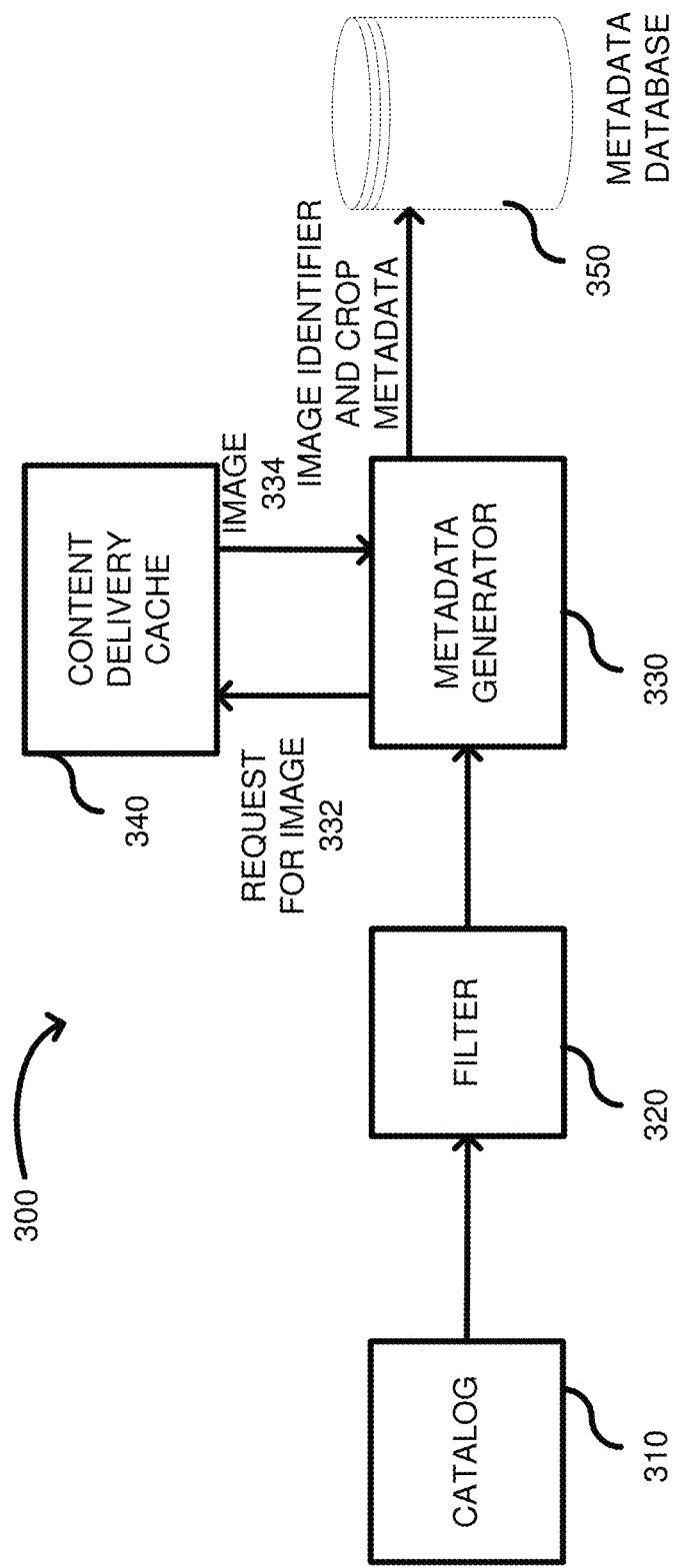
FIG. 3 is a system according to another embodiment, wherein metadata is generated for a catalog of images.

FIG. 3 illustrates a system 300 according to another embodiment, wherein new images are detected and metadata is generated for future cropping of the new images. A catalog 310 includes available images in the ecommerce marketplace and typically contains millions of images to be viewed. Different style tags are received to crop the images. The catalog 310 is a database or a server computer having storage thereon. A filter 320 is used to determine categories of images that are typically cropped in websites. For example, the filter 320 can filter fashion-based photos, such as models wearing women's dresses, shoes, etc. Alternatively, the catalog 310 includes identifiers of images, rather than the images themselves. The filter 320 is a server computer executing software to perform the filter function. A metadata generator 330 detects the new image in the catalog 310 via a notification from the filter 320. The metadata generator 330 uses the received identifier to request an image at 332. The image is then returned at 334. The metadata generator 330 performs one or more image cropping based on style tags supported. The image cropping requires image content and context analysis, which is compute intensive. Such backend processing occurs prior to browser requests such that the browser requests, when made, require substantially less compute time. The metadata generated by the metadata generator 330 is stored together with the image identifier in the metadata database 350. Example of metadata is a bounding box coordinates, line coordinates, predetermined pixel coordinates, etc.

Figure 4:
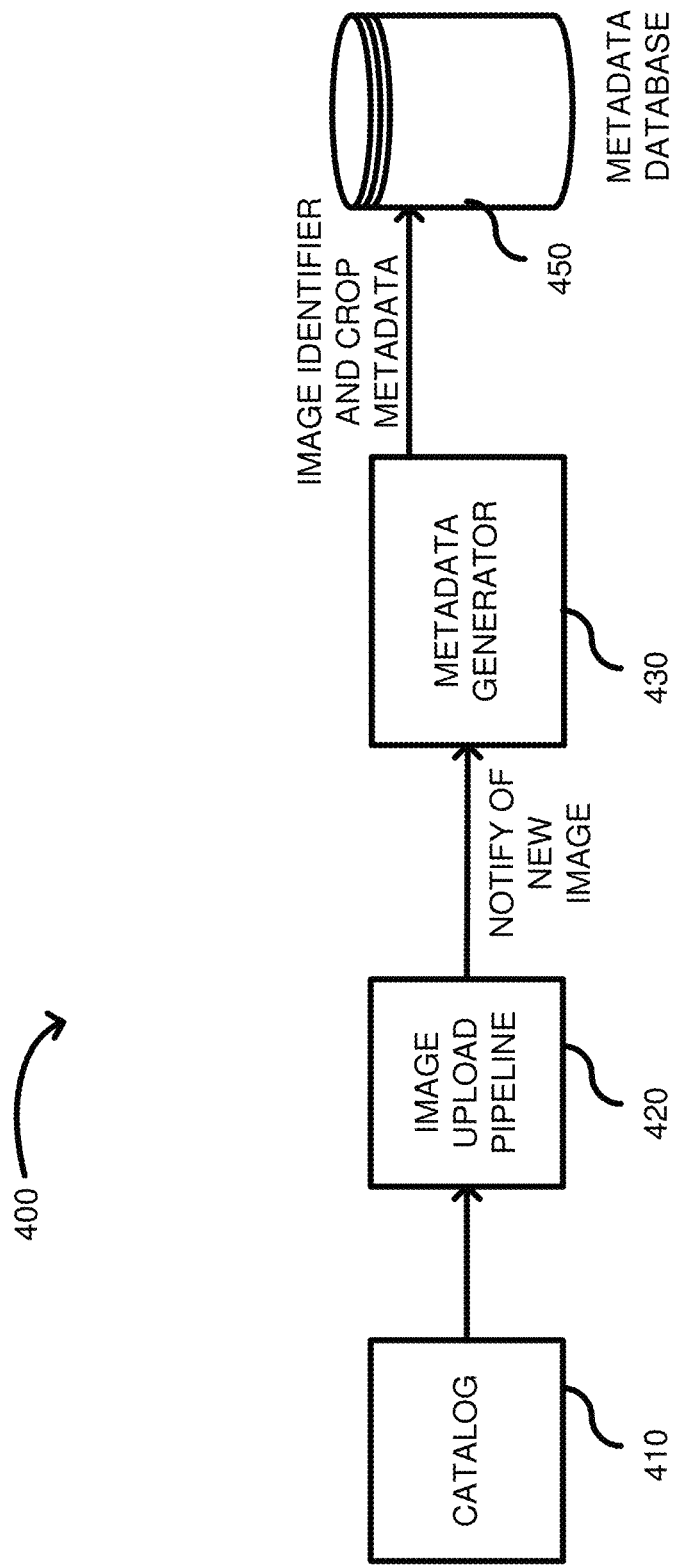
FIG. 4 is a system according to another embodiment, wherein a metadata generator receives a notification to process an image and generate metadata used for cropping the image.

FIG. 4 is an example of another embodiment of a system 400 wherein metadata is calculated for new images and stored for later use. At 410, a catalog has a plurality of original, uncropped images. The images are transmitted to an image upload pipeline 420, which detects new images not previously analyzed and transmits a notification to a metadata generator 430. The notification includes an identifier of the image, a category, a browse mode, etc. The metadata generator 430 obtains the image from the pipeline 420 or can alternatively obtain the image from a separate database, such as described above in FIG. 2. The metadata generator 430 generates the metadata and stores the metadata in association with the image identifier in the metadata database 450. The metadata is thereby available for later use in response to requests including a cropping stylus tag. A single image can have multiple different metadata coordinates, each associated with a different style tag. Thus, requests can include any supported style tags and the image is cropped using the retrieved metadata and only the metadata associated with the style tag of the request is used in the cropping, while metadata for other style tags is ignored. For example, a single image can have metadata associated with multiple bounding boxes, one for below the nose and another for above the neck. According to the style tag of the request, only the appropriate metadata is chosen.

Figure 5:
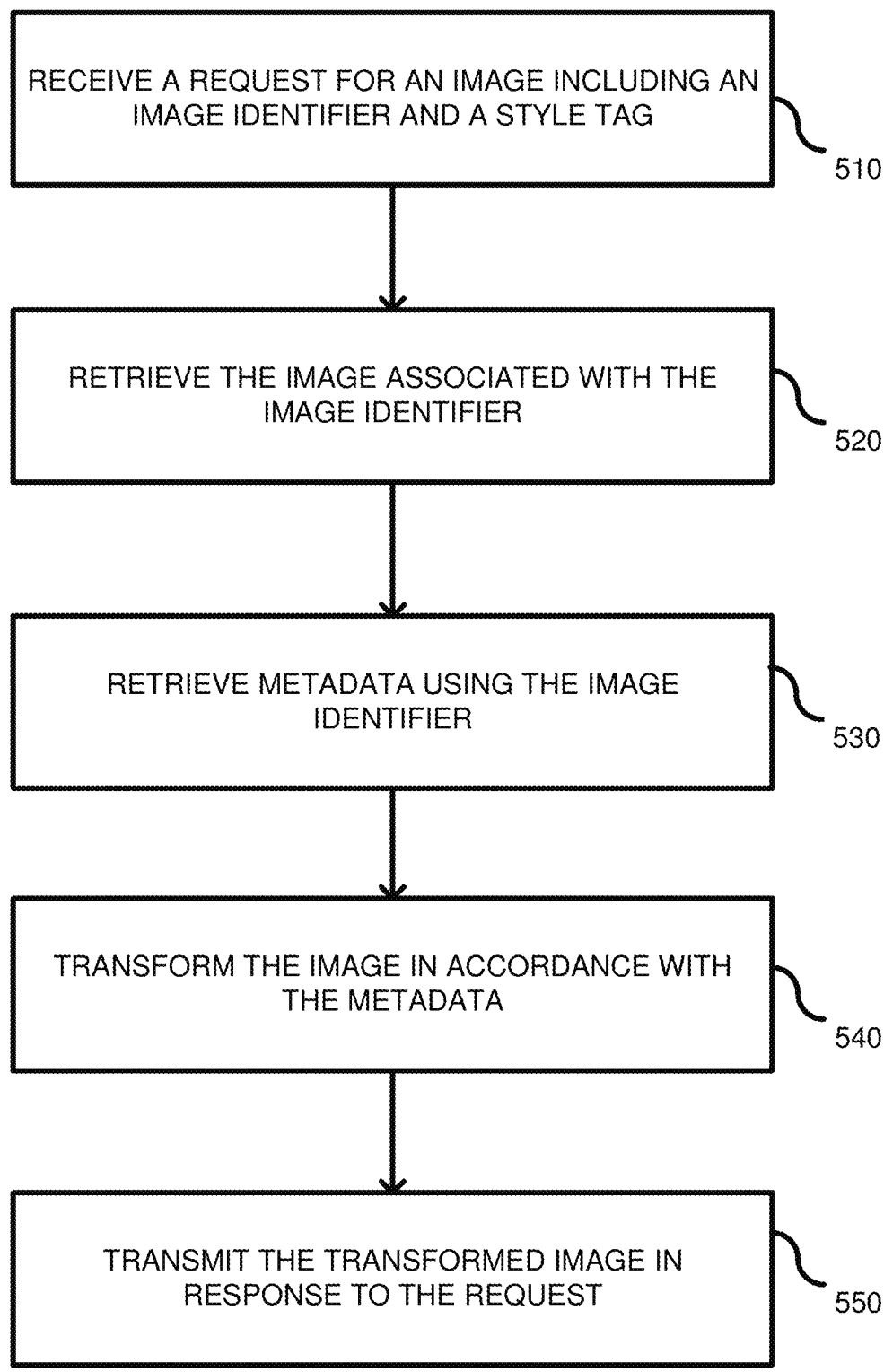
FIG. 5 is a flowchart according to one embodiment for image cropping using stored metadata.

FIG. 5 is a flowchart according to one embodiment for generating a transformed image using stored metadata. In process block 510, a request is received for an image including an image identifier and a style tag. The image identifier is any desired identifier, such as a Globally Unique Identifier (GUID), and the style tag is a markup language tag, such as an HTML style tag, that indicates to the browser to transform an image. The style tag can be a variety of potential cropping types, such as a nose-down crop, mouth-up crop, etc. In one example, a facial feature is chosen and cropping is based on identification of the facial feature in the image. The cropping typically starts with a top or bottom of the identified facial feature. Other transformation of the image can also be associated with the style tag, such as modifying saturation, modifying brightness, modifying contrast, changing to black and white, etc. At process block 520, an image is retrieved that is associated with the image identifier. For example, in FIG. 2, the metadata generator 232 retrieves an image from the image database 236. In process block 530, metadata is retrieved using the image identifier. Thus, image analysis previously performed on the image is retrieved from a metadata database, such as the metadata database 234 (FIG. 2). In process block 540, the retrieved image is transformed in accordance with the metadata. Thus, the metadata provides specific information on how to transform the image to conform with the style tag. For example, in FIG. 1, the metadata 160 provides a bounding box that starts with the nose-down cropping to result in the image 170. Cropping using a bounding-box result is performed quickly and no facial detection or face alignment is needed after the request is made, as the metadata was pre-generated (generated prior to the request or offline). At process block 550, the transformed image is transmitted in response to the request. For example, in FIG. 2, the image cropping occurs by server computer 232, which crops the image in conformance with the metadata 260 and transmits the response to the content delivery cache 230, which caches the resultant image, and then transmits the image 280 as a response. Thus, the browser 210 receives an image that is cropped at request time in conformance with the cropping style tag.

Figure 6:
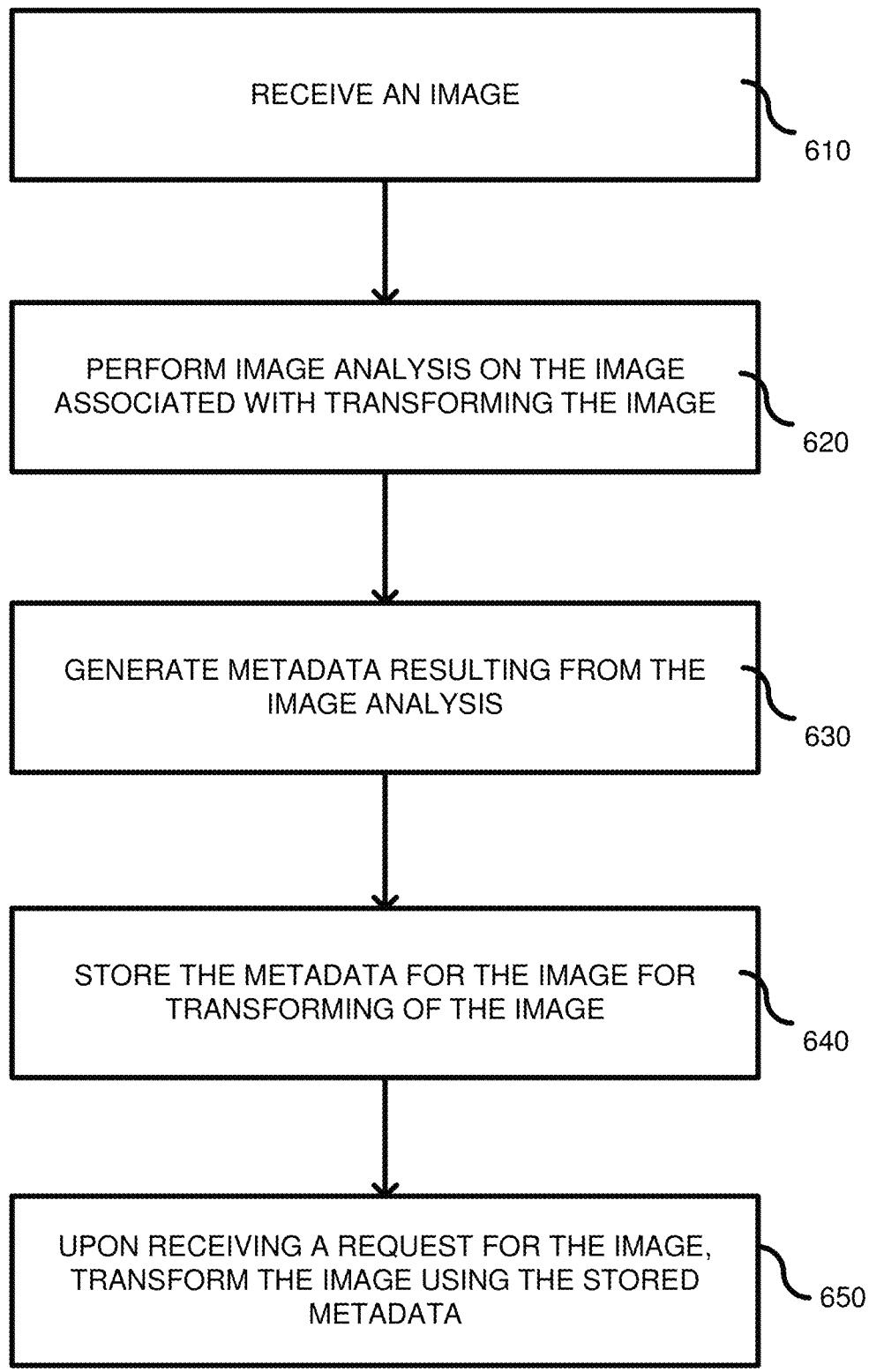
FIG. 6 is a flowchart according to another embodiment for generating metadata used for cropping an image.

FIG. 6 is a flowchart according to one embodiment for generating metadata used for future transformation (e.g., cropping, adjustment in saturation, contrast, brightness, extracting portions of the image, etc.) of an image. In process block 610, an original image is received. Typically, the original image is stored unmodified and the transformation occurs dynamically at run-time. In process block 620, image analysis is performed on the image associated with transforming of the image. Such a transformation requires content and context analysis and recognition. In one example, facial feature recognition or identification of body parts is performed. In process block 630, metadata is generated resulting from the image analysis. Thus, a result of the image analysis is summarized as metadata, such as a bounding box, a line indicating a location of a nose or other facial feature, etc. In process block 640, the metadata is stored for the image and is retrieved later when a request is received to transform the image. For example, the metadata is stored in the metadata database 234 (FIG. 2). In process block 650, upon receiving a request for the image, the image is transformed using the stored metadata.

Figure 7:
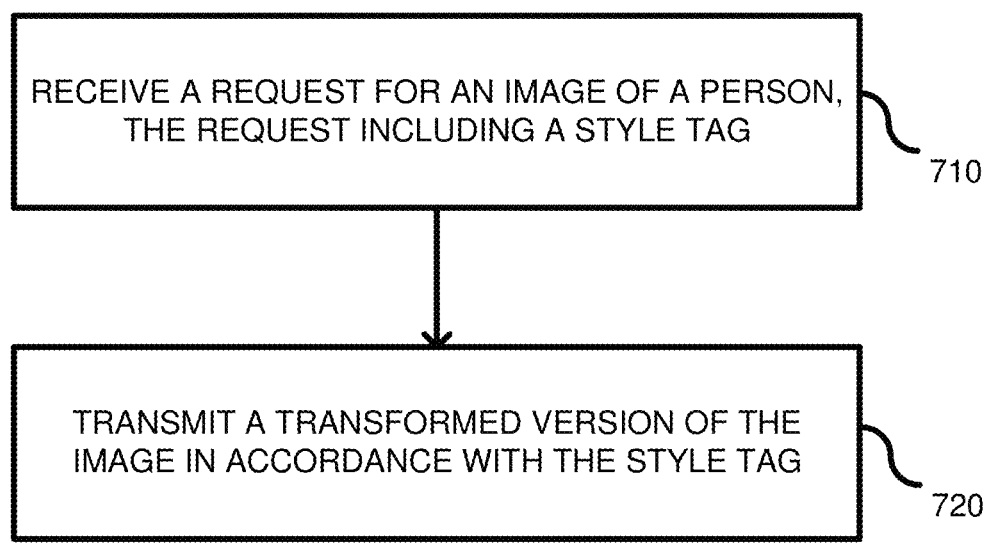
FIG. 7 is a flowchart according to yet another embodiment for using a cropping style tag in a request.

FIG. 7 is a flowchart according to another embodiment for dynamically transforming an image in response to a request including a style tag. In process block 710, a request is received for an image of a person. The request includes an image identifier and a style tag. The style tag provides an indication of how to dynamically transform the image. In process block 720, a transformed version of the image is transmitted in accordance with the style tag. Thus, the style tag is used to identify a portion of a person in the image that is to be shown as a result of the transformation. Another portion of the person is removed from the image. The transformation of the image is performed after the request using stored metadata that is used to understand the content of the image and how to modify the image in relation to that content.

Figure 8:
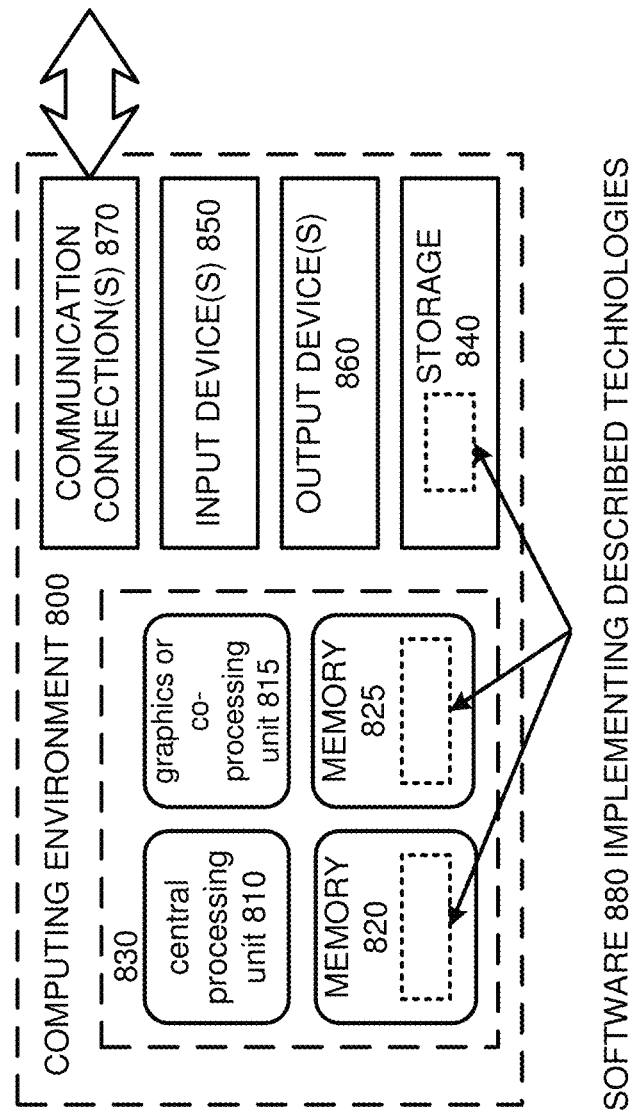
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). The computing environment 800 can be used, for example, to implement the metadata generator and image cropping 232.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of cropping an image, the method comprising:
receiving a request for an image, the request including an image identifier and a style tag indicating how to transform the image;
retrieving the image associated with the image identifier;
retrieving metadata using the image identifier, the metadata indicating how to transform the image in accordance with the style tag, wherein the metadata includes coordinates of a bounding box so that the image can be cropped without analyzing a content or context of the image;
transforming the image using the metadata; and
transmitting the transformed image in response to the request.

2. The method of claim 1, wherein the metadata includes transformation rules for modifying the image.

3. The method of claim 2, wherein the transformation rules including rules for cropping the image using the coordinates stored for use in cropping the image.

4. The method of claim 1, wherein the metadata is generated prior to receiving the request by performing machine learning on the image and storing pixel coordinates as the metadata.

5. The method of claim 1, wherein the style tag is associated with a nose-down cropping and the metadata includes pixel coordinates for performing cropping of the image below a nose of a person in the image.

6. A method, comprising:
receiving an image;
performing image analysis on the image associated with cropping of the image;
generating metadata resulting from the image analysis;
storing the metadata for the image to be used when receiving a request for the cropping of the image, wherein the storing of the metadata includes storing a bounding box giving coordinates of how to crop the image;
upon receiving a request for the image, transforming the image using the stored metadata without further analyzing a content or context of the image.

7. The method of claim 6, wherein the metadata is stored in association with a cropping style tag and further including retrieving the metadata in response to a request including the cropping style tag.

8. The method of claim 7, further including receiving a request for an image, wherein the request includes the cropping style tag, and performing the cropping of the image in response to the request by retrieving the stored metadata associated with the image and cropping the image in conformance with the metadata.

9. The method of claim 6, further including filtering images from a catalog and generating the metadata for the filtered images.

10. The method of claim 6, wherein the metadata is stored in association with an identifier of the image and the image is stored separately from the metadata using the identifier.

11. The method of claim 6, further including receiving a request for an image, wherein the request includes a style tag that is associated with a nose-down cropping and retrieving the metadata and using the metadata to perform the nose-down cropping on the image.

12. A method, comprising:
performing machine learning analysis on an image to extract content and context of a person within the image and generating metadata to perform cropping of the image, wherein the metadata includes a bounding box giving coordinates of how to crop the image;
receiving a request for the image of a person, wherein the request includes a cropping style tag;
in response to the request, cropping the image using the generated metadata and in conformance with the cropping style tag without further analyzing a content of the image; and
transmitting a cropped version of the image which has only a portion of the person in the image in accordance with the cropping style tag.

13. The method of claim 12, wherein the image is an original image and the transmitting of the cropped version of the image has a portion of the original image removed.

14. The method of claim 12, wherein the cropping style tag is a nose-down cropping and the portion of the person in the cropped version of the image is from a nose of the person down to feet of the person.

15. The method of claim 12, wherein the metadata is prestored for use when receiving the request.

16. The method of claim 12, wherein the metadata is bounding box coordinates used for cropping of the image.

17. The method of claim 12, wherein the request is from a browser of a client computer.

* * * * *